J. WADE.
THILL-COUPLINGS.
No. 185,845. Patented Jan. 2, 1877.
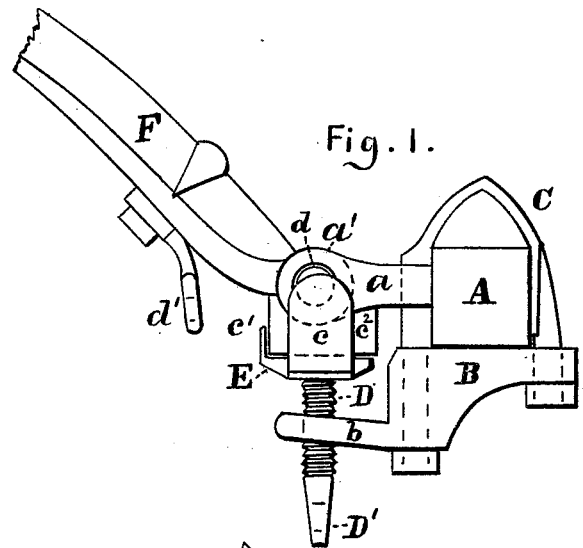
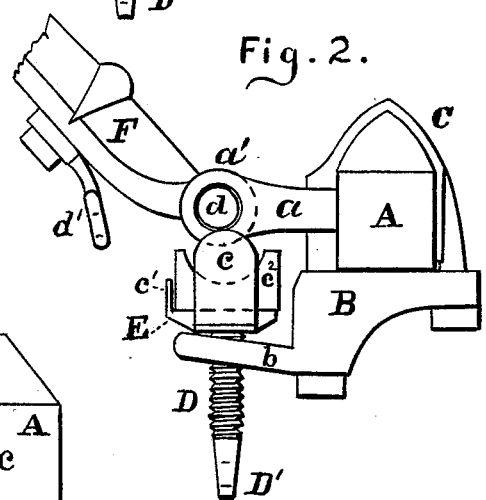
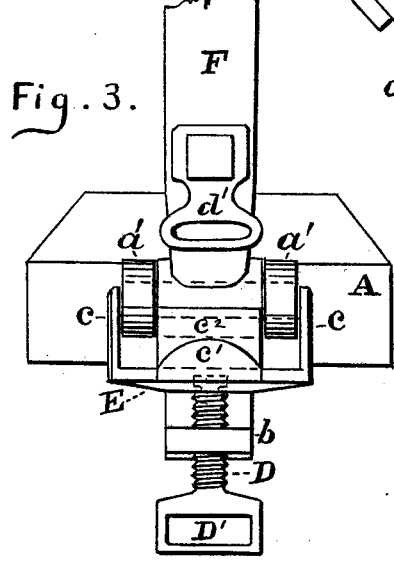
Witnesses:
H. A. Daniels.
A. Lacey.
Inventor:
John Wade
by W. Burris
Attorney.

UNITED STATES PATENT OFFICE.

JOHN WADE, OF BEAVER DAM, WISCONSIN.

IMPROVEMENT IN THILL-COUPLINGS.

Specification forming part of Letters Patent No. 185,845, dated January 2, 1877; application filed June 19, 1876.

*To all whom it may concern:*

Be it known that I, JOHN WADE, of Beaver Dam, in the county of Dodge and State of Wisconsin, have invented certain new and useful Improvements in Carriage-Couplings; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a side view, showing the thill coupled. Fig. 2 is the same view, showing the screw and plate down, to allow the coupling-bolt to be inserted or removed. Fig. 3 is a front view.

My invention relates to thill-couplings, constructed as hereinafter described.

A is the axle. C is the clip, having arms $a$, provided with eyes $a'$, to receive the coupling-pin. B is a clip-bar, having an offset and a projection, $b$, provided with a female screw to receive the set-screw D, having a slotted head, $D'$, to receive the stay-strap. The upper end of the screw is connected by a swivel-joint to a plate, E, which is provided with guard-lugs $c\ c$ on the ends of the plate, to hold in place the coupling-bolt $d$, made without a head or burr on either end, and with lug $c^1$ on the front of the plate, to hold the rubber bearing $c^2$. F is the thill or tongue, provided with a loop or eye, $d'$, to receive the forward end of the stay-strap.

To attach or detach the thills, the screw D is turned downward, removing the lugs $c$ from the coupling-eyes $a'$, to allow the coupling-bolt $d$ to be inserted or removed, as shown in Fig. 2 of the drawings. The screw is then turned upward, bearing up the plate and rubber against the coupling, and raising the lugs $c$ outside of the eyes $a'$ sufficiently to hold in place the coupling-bolt $d$, as shown in Figs. 1 and 3 of the drawings. The set-screw D is prevented from unscrewing in use by the stay-strap through the slotted head $D'$, and thus the rubber bearing $c^2$ is held against the coupling, preventing it from rattling, and the guard-lugs $c$ are securely held in position to hold the coupling-bolt in place, preventing the liability of the thills becoming uncoupled.

What I claim as new in thill-couplings, and desire to secure by Letters Patent, is—

The set-screw D, provided with slotted head $D'$, and having its bearing in the projection $b$ of the clip-bar B, in combination with the plate E, having lugs $c\ c\ c^1$, coupling-eyes $d'$, and bolt $d$, substantially as and for the purposes described.

In testimony that I claim the foregoing as my own invention, I affix my signature in presence of two witnesses.

JOHN WADE.

Witnesses:
JAMES H. RICHARDSON,
EDWARD H. SEWELL.